United States Patent [19]

Blank-Bewersdorff et al.

[11] Patent Number: 5,301,403

[45] Date of Patent: Apr. 12, 1994

[54] METHOD OF PRODUCING METAL FOIL FROM A REACTIVE METAL SHEET UTILIZING A HOT ROLLING THERMAL PACK ASSEMBLY

[75] Inventors: Margret Blank-Bewersdorff, Zürich; John A. Peters, Winterthur, both of Switzerland

[73] Assignee: Gebrueder Sulzer Aktiengesellschaft, Winterthur, Switzerland

[21] Appl. No.: 43,063

[22] Filed: Apr. 6, 1993

[30] Foreign Application Priority Data

May 8, 1992 [EP] European Pat. Off. ........ 92810338.1

[51] Int. Cl.$^5$ .............................................. B21D 33/00
[52] U.S. Cl. ....................................... 29/17.5; 29/17.4; 29/17.6; 29/423
[58] Field of Search ..................... 29/17.1, 17.2, 17.4, 29/17.5, 17.6, 17.9, 423

[56] References Cited

U.S. PATENT DOCUMENTS

| | | |
|---|---|---|
| 2,645,842 | 7/1953 | Orr . |
| 2,985,945 | 5/1961 | Nordheim . |
| 2,997,784 | 8/1961 | Petrovich et al. .................. 29/17.6 |
| 3,122,423 | 2/1964 | Hessler . |
| 4,966,816 | 10/1990 | Wardlaw . |
| 5,127,146 | 7/1992 | Wittenauer ........................ 29/17.5 |

FOREIGN PATENT DOCUMENTS 0374094 6/1990 European Pat. Off. .

OTHER PUBLICATIONS

Patent Abstracts of Japan, vol. 010, No. 115, Apr. 30, 1986; JP-A-60 244 491.

*Primary Examiner*—Mark Rosenbaum
*Assistant Examiner*—David P. Bryant
*Attorney, Agent, or Firm*—Townsend and Townsend Khourie and Crew

[57] ABSTRACT

The method according to the invention enables thin metal parts (10), in particular metal foil, to be produced from a reactive metal by means of hot forming. The reactive metal is embedded in a capsule (11), which consists of a second, plastically deformable metal, and release agents consisting of powder particles. The parting agents between the capsule wall and the reactive metal are applied in at least two layers (12, 13), preferably as an aqueous dispersion. The powder particles (e.g. boron nitride) of a first layer (13) which is applied to the reactive metal form an essentially more compact packing than the powder particles (e.g. calcium fluoride) of a second layer (12). The release agent of the second layer is plastically deformable or fluid in a highly viscous manner during the hot forming process. The novel method is less expensive than known methods in which the parting agent is applied by a thermal spraying process.

11 Claims, 2 Drawing Sheets

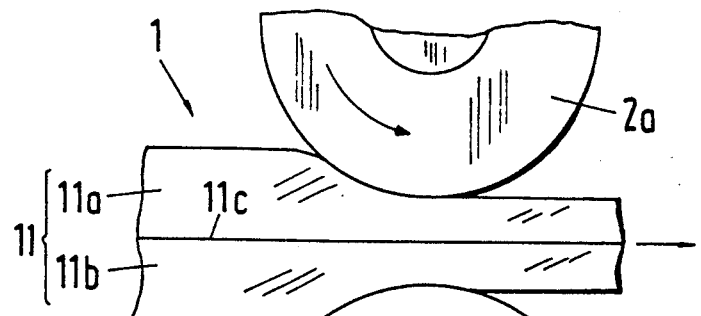
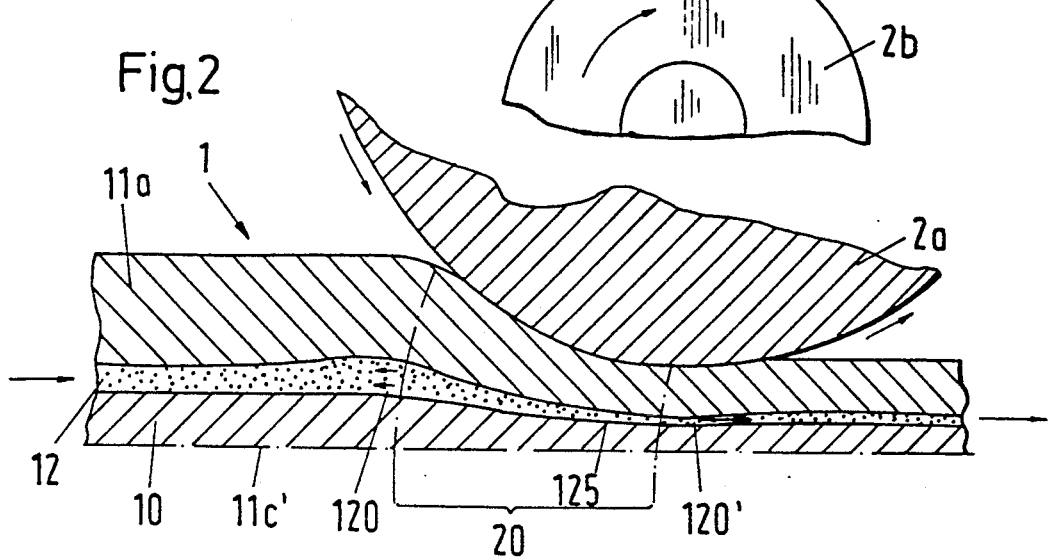
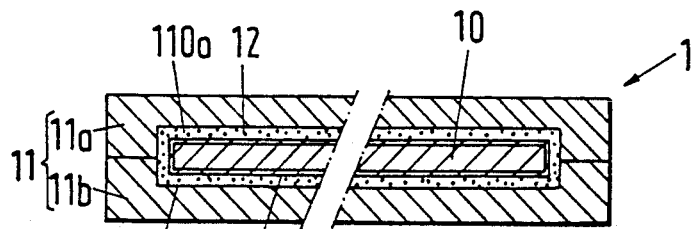
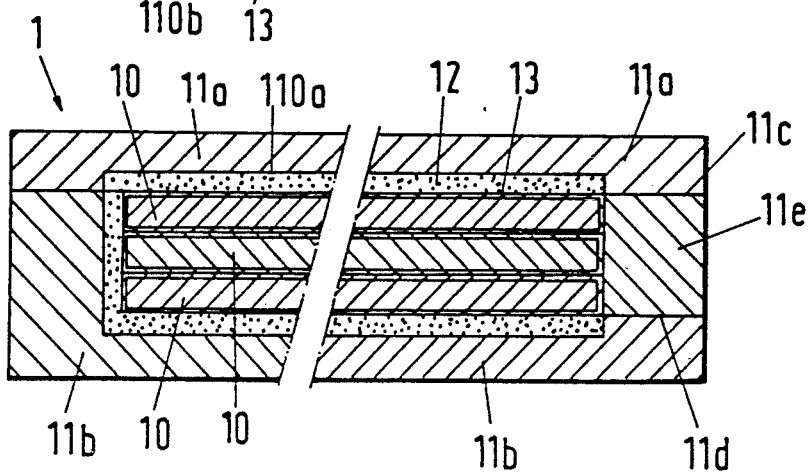

METHOD OF PRODUCING METAL FOIL FROM A REACTIVE METAL SHEET UTILIZING A HOT ROLLING THERMAL PACK ASSEMBLY

SUMMARY OF THE INVENTION

The invention relates to a method for deforming reactive metal pieces through hot forming to produce thin-walled metal parts and to a pack for carrying out the method. The reactive metal which is formed is susceptible to corrosion and, in particular, oxidation at elevated temperatures. The hot forming is preferably carried out by means of a conventional hot-rolling device. The thin-walled metal parts which are produced according to the method of the type in question are preferably in the form of metal foil. The reactive metal forms a sandwich-like pack with the capsule and the release agents. The capsule, which consists of at least two parts (cover plates) which are welded together, seals off the reactive metal from the environment so as to make it gas-tight (owing to a continuous weld seam). This prevents a deterioration in quality which would occur due to oxidation, for example. The release agents, which are inert with respect to the reactive metal, prevent a metallurgical bond from occurring between the reactive metal and the capsule during the hot forming process. During hot rolling, the release agents undergo plastic deformation under the pressure which is produced or flow like a highly viscous liquid; in doing so they always produce a uniform, continuous release layer between the metals. On the other hand, the release agents are brittle at ambient temperature, so that the formed metals can be easily separated from one another.

The method of the type in question for producing foil is known from EP-A-0374094: A sheet-like metal piece is enveloped in a capsule which is composed of two cover plates and a frame-like intermediate piece. The reactive metal of which this metal piece consists is, for example, a titanium aluminide ($Ti_3Al$-base alloy), which can be formed at around 1000° C. Metal halides, in particular calcium fluoride ($CaF_2$, melting point 1360° C.), are proposed as release agents which are inert with respect to titanium aluminides. The release agent is placed in cavities in the capsule cover plates, with layers of a thickness from 0.4 to 2 mm being produced. The release agent, which is in the form of a powder, is preferably applied by a thermal spraying method (e.g. atmospheric plasma spraying), in which air inclusions are advantageously absent. Other application methods in which the release agent is spread or sprayed on in the form of an aqueous solution or as a slurry produce porous layers which contain air.

The known method which enables foil of a high quality to be produced is, however, expensive. The production of a capsule ready for rolling in particular necessitates several cost-intensive production steps (milling out the cavities, producing the frame, welding the capsule with two gas-tight weld seams). In order to improve competitiveness, the aim is therefore to look for ways of economising when producing the capsule. Regarding the method in which the release agent is applied to the capsule wall (i.e. thermal spraying), it should also be considered whether less expensive methods (application by means of a slurry, for example) would also achieve the object.

Attempts to apply calcium fluoride as an aqueous solution by means of a spray device (after which the layer is dried in an oven) have produced relatively good results. This showed that, generally speaking, it is not necessary to use the expensive thermal spraying method. However the surface properties of the recently produced foil are still unsatisfactory: the roughness is too great and the surface has to be mechanically reworked by grinding and polishing. (Grinding at the same time removes release agent residues adhering to the surface).

The surface of the foil must be ground very carefully to avoid tearing the latter. The risk of tearing increases with the roughness; grinding also results in more material being wasted. The object of the invention is to develop the known method for producing foil such that the roughness values of the produced foil (directly after forming and removal of the capsule) are low. This object is solved by means of the method described below.

The improvement in the roughness values by means of the method according to the invention has been proven by experiments. Roughness measurements taken on fifteen pieces of foil (70 measured values) produced according to the previous method and using calcium fluoride as the parting agent yielded an average roughness $R_a$ (=arithmetical average roughness) value of 1.59 μm with a standard deviation of 0.89 μm. The release agent used in the method according to the invention for the first layer was boron nitride (BN, melting point approximately 3000° C.), which was spread in the form of an aqueous solution (10% BN) onto the titanium aluminide sheets to be formed. Calcium fluoride was again used for the second layer. Roughness measurements taken on foil (again 15 pieces) produced according to the method of the invention yielded for $R_a$ the average value 1.47 μm with a standard deviation of 0.45 μm. It is obvious that the novel method provides an improvement, which is particularly striking with regard to the standard deviation.

The calcium fluoride which is used consists of powder particles the diameters of which have a size distribution of between approximately 1 and 20 μm. The powder particles are porous and formed by spherical agglomerates of flake-like crystals. The parting layer formed by calcium fluoride is a cluster of particles and, therefore, has a relatively large void portion (approximately 40%). The powder particles of the boron nitride are slightly smaller than those of the calcium fluoride (for example between approximately 1 and 10 μm). Instead of being agglomerates, however, these particles are wafer-like crystals which result in an essentially more compact packing than the calcium fluoride particles and, in particular, form a better covering for the surface of the reactive metal.

Due to the more compact covering of the boron nitride, the surface of the titanium aluminide is better protected from the oxygen in the void between the particles of the parting agent. The oxidation which takes place at elevated temperatures at the surface points which are not covered impairs the grain structure of the metal and thus its ductility. The roughness of the foil can be regarded (at least in part) as a consequence of the detrimental effect which the oxygen has on the reactive metal. The method according to the invention of improving the protection of the reactive metal by means of a special layer reduces the roughness as desired.

Other nitrides (e.g. silicon nitride), oxides (e.g. zirconium oxide) or carbides may be used instead of boron nitride. Apart from titanium aluminide, other metallic phases (e.g. aluminides, silicides) are suitable for forming; other possibilities are beryllium-, niobium-, molybdenum-, tantalum-, tungsten- or titanium-base alloys.

The invention is explained in detail in conjunction with the drawings.

BRIEF DESCRIPTION OF THE DRAWINGS

FIG. 1 shows a roll pair while forming an encapsulated metal piece,

FIG. 2 is a longitudinal section through the encapsulated metal piece of FIG. 1, FIG. 3 is a cross section through a metal piece encapsulated according to the invention, FIG. 4 shows further embodiments of the encapsulation according to the invention.

DESCRIPTION OF THE PREFERRED EMBODIMENT

Figure 5:
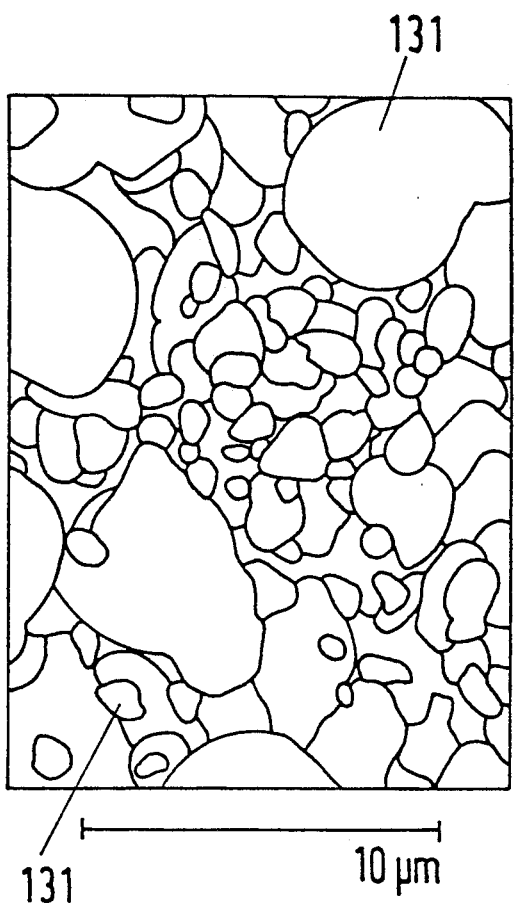
FIG. 5 shows a release agent layer of boron nitride (magnified 5000 times, drawn according to an REM image)

The pack 1, which consists of an encapsulated reactive metal, is formed at an elevated temperature (approximately 1000° C.) by the two rolls 2a and 2b, which rotate in opposite directions, in FIG. 1. The capsule 11 of the pack 1 consists of two parts, i.e. the cover plates 11a and 11b, which are joined together by a weld seam 11c. The forming process is illustrated by the longitudinal section of FIG. 2, which only shows the top half of the arrangement of FIG. 1 (axis of symmetry 11c'). A release agent, for example calcium fluoride, forms the release layer 12 between the metal piece 10, which consists of the reactive metal, and the top cover layer 11a. The cross section of the pack 1 is reduced in the forming zone 20 under the compressive forces exerted by the roll pair 2a, 2b. The cross-sectional height of the metal piece 10 can be reduced from an initial value of, for example, 3 mm to a final value of 0.15 mm by means of several rolling passes.

During the forming process the release layer 12 must behave in a plastic manner which corresponds to the ductility of the capsule material or the reactive material; it must in particular be able to transmit shear forces from the cover layer 11a (or 11b) to the metal piece 10. On the other hand, the release agent must be inert with respect to the reactive metal and, in particular, may not therefore be metallic. The release agent may be fluid to a limited degree (i.e. highly viscous)—comparable with glass which is still solid around its melting point. On account of this fluidity, a certain mass transfer of the release agent takes place from the forming zone 20. This is indicated by the arrows 120 and 120' in FIG. 2. As a result of its ability to transmit shear forces, the release agent in the surrounding area prevents an uncontrolled flow out of the forming zone 20, so that a metallurgical bond between the capsule 11 and the metal piece 10 is inhibited on account of a film 125 which is always continuous. Calcium fluoride is a substance which meets the above-mentioned requirements, whereas boron nitride, whose melting point is approximately 2000° C. above the rolling temperature, does not have the required fluidity. Boron nitride can, however, be used if combined with calcium fluoride, according to the teaching of the invention, and its property of providing a more compact covering for the reactive metal than calcium fluoride can be utilised in this combination.

The cross section through the pack 1 in FIG. 3 shows a symmetrical capsule 11, in which the cavities 110a and 110b in the cover plates 11a and 11b are of a depth such that there is space for the metal piece 10 as well as the release agents. According to the invention the release agents form two layers: the layer 12 with the fluid release agent (e.g. calcium fluoride) and the layer 13 with the covering release agent (e.g. boron nitride). The layer 13 is applied to the metal piece 10; the layer 12 is preferably introduced into the cavities 110a and 110b.

Tests have shown that, instead of just one metal piece 10, two or more pieces may also be formed in the same capsule 11, in which case it is sufficient for adjacent metal pieces 10 to be separated from one another just by the boron nitride parting layer. FIG. 4 shows a pack 1 with three metal pieces 10 of a reactive metal, with two possible embodiments of the capsule 11 being shown at the same time.

The capsule 11 is asymmetrical on the left-hand side of FIG. 4: the cavity 110a in the covering layer 11a is only provided to accommodate the release agent; the other capsule half 11b is in the form of a trough and has additional space for the metal pieces 10. This formation of the capsule can be simplified still further by using a plate without a cavity 110a for the covering layer 11a. In this case space must of course also be left in the trough-like capsule half 11b for the parting layer 12 between the top metal piece 10 and the cover plate 11a.

The right-hand side of FIG. 4 shows a capsule structure as known from EP-A-0374094. Here, a frame-like intermediate piece 11e is joined by two weld seams 11c and 11d to the two cover plates 11a and 11d to form the capsule 11. In this case, unlike the above-mentioned application, it is possible to encapsulate more than just one metal piece 10. According to known methods a stack of packs is to be used to simultaneously produce more than one metal foil.

Figure 6:
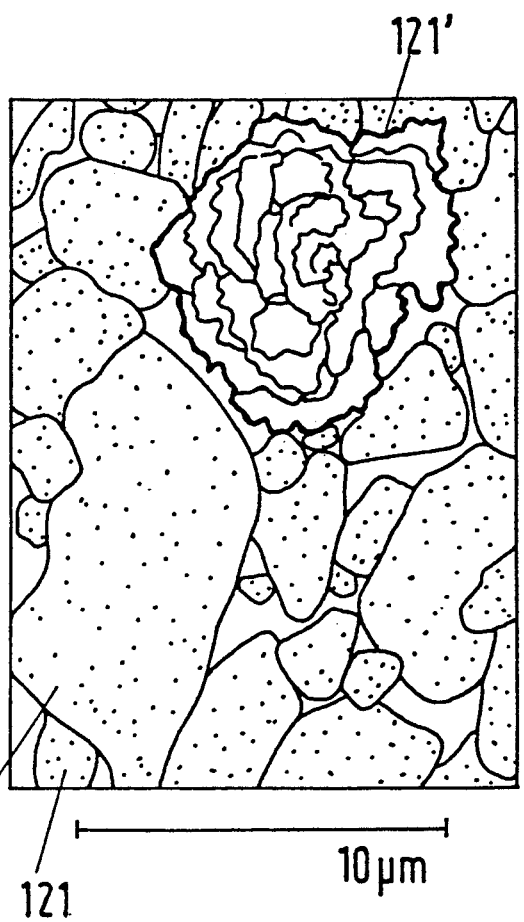
FIG. 6 shows a release agent layer of calcium fluoride (as shown in FIG. 5)
Figure 7:
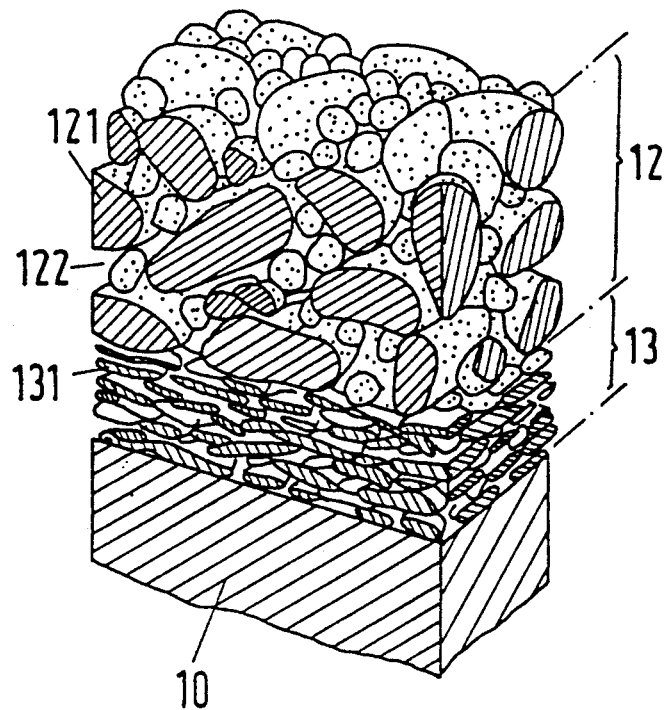
FIG. 7 is an oblique view of the layer structure of the release agent according to the invention.

The purpose of FIG. 5 is to convey an impression of how the boron nitride layer would look in plan view if magnified 5000 times. Only the outlines of the individual powder particles 131 are drawn. The surfaces of the particles are quite smooth and extend parallel to the plane of the drawing. The horizontal bar at the bottom edge of the Figure corresponds to a length of 10 $\mu$m. A corresponding image is shown in FIG. 6 for calcium fluoride, as used as a release agent. The powder particles 121, the three-dimensional aspect of which is not shown in this image, are porous (indicated by dots). As indicated for a particle 121', the particles appear as agglomerates of flake-like crystals. Finally, FIG. 7 shows how the calcium fluoride particles 121 of the layer 12 form a cluster with a relatively large void 122 and how the boron nitride particles 131 of the layer 13 provide a relatively good cover for the metal piece 10.

The starting point of the invention is to apply the powdery release agents to the cover plates of the capsule after dispersing them in water. It is, however, also possible to produce a dispersion with organic, readily volatile liquids, for example propanol. (A mixture of propanol with terpineol —mixture of different alcohols—has proved to be more advantageous than just propanol. Resin-like binders may also be added to the dispersion medium.) In all cases, however, it is important to ensure that the liquids evaporate again through drying in an oven, for example, after the release agent has been applied.

We claim:

1. A method for forming a thin metal sheet from a piece of reactive metal by hot forming the reactive metal piece, the method comprising the steps of:
  applying a first layer of a first release agent consisting of powder particles to a surface of the piece;
  applying a second layer of a second release agent consisting of powder particles on a side of the first layer opposite from the piece, the first release agent comprising a substantially more compact packing of the powder particles than the second release agent;
  embedding the reactive metal piece with its first and second layers of release agents within opposing, plastically deformable cover plates so that the second layer contacts a surface of the cover plates;
  applying heat and pressure to the cover plates and therewith to the reactive metal piece to form the thin metal sheet; and
  plastically deforming the second layer to a greater extent than the first layer while applying heat and pressure.

2. The method according to claim 1 wherein the reactive metal is titanium aluminide.

3. The method according to claim 1 wherein the release agent of the first layer is fine-grained and consists of wafer-like particles.

4. The method according to claim 1 wherein the release agent of the first layer consists of boron nitride.

5. The method according to claim 1 wherein the release agent of the second layer is a metal halide.

6. The method according to claim 1 wherein the release agent of the second layer is calcium fluoride ($CaF_2$).

7. The method according to claim 1 wherein the reactive metal piece is in the form of a sheet.

8. The method according to claim 1 wherein a plurality of thin metal sheets are formed from a reactive metal piece consisting of at least two sheets arranged in a vertical stack, the sheets being separated by the release agent of the first layer, said release agent consisting of boron nitrate powder particles.

9. The method according to claim 1 wherein at least one of the release agents is applied as a dispersion.

10. The method according to claim 9 wherein at least one of the release agents is dispersed in water.

11. The method according to claim 9 wherein at least one of the release agents is dispersed in an organic, readily volatile liquid.

* * * * *